3,081,175
PROTECTION OF STRUCTURES IN SEA WATER
William Godfrey Waite and William F. Higgins, London, England, assignors to F. A. Hughes & Co. Limited, London, England, a British company
No Drawing. Filed Dec. 17, 1958, Ser. No. 780,939
4 Claims. (Cl. 106—15)

The present invention relates to a process for reducing the fouling, by marine growth, of structures, such as ships' hulls which are immersed in sea water.

It is well known that structures which are immersed in sea water become fouled by barnacles and other types of marine growth. In order to reduce such marine fouling we have experimented with the use of substances adapted to destroy marine vegetation over the submerged parts of a ship's hull. Examples of such destructive agents were the exhaust gases of internal combustion engines and oil. The use of oils can be of value but has the disadvantage that any excess oil may cause pollution in the sea area surrounding the structure being treated.

An object of the present invention is to increase the efficiency of the use of oil and similar liquids in the reduction of marine fouling. A further object is to reduce the quantity of oil or similar liquid required for a given degree of protection and thus decrease the possibility of pollution.

According to the present invention the process for the reduction of the marine fouling of structures immersed in sea water comprises discharging against the structure a substantially water-insoluble, liquid, marine growth deterrent containing a wetting agent to improve the ability of the deterrent to wet the underwater surface of the structure.

Any structure which is either permanently or periodically immersed in sea water can be protected from marine fouling by the process of the present invention. The process is particularly valuable for reducing the fouling of ship's hulls.

The marine growth deterrent must be liquid at the temperature of the sea surrounding the structure and must be sufficiently water-insoluble to allow it to wet the underwater surface of the structure before complete solution occurs. Where the marine growth deterrent consists of a solution or dispersion of a toxic compound in a suitable liquid vehicle, both the compound and the liquid vehicle must be sufficiently water-insoluble to enable the marine growth deterrent to wet the surface of the hull or structure. Slow solution of the deterrent or any of its components in sea water can be tolerated.

The marine growth deterrent can be a liquid which itself prevents or hinders marine growth or it can be a solution or dispersion of a compound, having the desired growth deterrent properties, in a liquid vehicle. This vehicle need not have growth deterrent properties. Particularly suitable liquids are the liquid paraffin hydrocarbons and the preferred liquids are kerosene and light diesel oils which are readily available and have a deterrent effect on the growth of marine fouling. If desired they can also be used as liquid vehicles for the solution or dispersion of compounds which are toxic to marine growth.

Compounds which can be dissolved or dispersed in suitable liquid carriers to provide marine growth deterrents for use in the process of the present invention are solid metals or metal compounds, for example the oxides of copper, arsenic or mercury; and organic compounds such as 2:4-di-isobutyl phenol, phenyl mercury nitrate and acetate, pyrethrum, pentachlorophenol, derris extract, ethyl bromoacetate, zinc phenyl dithiocarbamate, diphenyl arsenious acid, dichloro-diphenyl-trichloroethane, and p-dichlorobenzene.

The wetting agent present in the liquid marine growth deterrent increases the latter's ability to wet the underwater surface of the structure being treated and thus ensures efficient use of the liquid deterrent.

The possibility of using a wetting agent at first appeared to be impracticable because it seemed unlikely that a wetting agent could spread oil on a metal surface preferentially to the sea water. Wetting agents normally spread water on a solid surface, but it is found that the "wetting agents" as used in the present invention spread the oil on the solid surface. Moreover, wetting agents would be expected to fail because of emulsification especially if the oil is discharged by means of a carrier gas such as compressed air or the exhaust from internal combustion engines. Nevertheless although some emulsification does occur the wetting agent does have a surprisingly high degree of spreading effect on the oil.

By wetting agent is meant throughout this specification a substance which, when dissolved in oil, causes the oil to displace water from the surface of the structure. The wetting agent is normally an organic compound having essentially a hydrophobic and a hydrophilic or surface active portion. When the liquid deterrent comes in contact with the sea water the presence of the wetting agent therein decreases the interfacial tension between the liquid deterrent and the sea and thus aids the flow of the deterrent over any surface immersed in the sea with which it comes into contact. Wetting agents are broadly classified as anionic, neutral or cationic according to the nature of their surface active portion. All three types of wetting agent can be employed in the process of the present invention. Wetting agents which are not strong emulsifying agents are preferred because there is then less tendency for the formation of a stable emulsion of the liquid deterrent in the sea water which might prevent the deterrent remaining in contact with the underwater surface of the structure being treated.

Certain of the hydrophilic chemical groups present in wetting agents are known to be attracted to metallic surfaces, in particular ferrous metal surfaces. Amine, including quaternary amine, groups are examples of such groups and consequently wetting agents containing amine groups are particularly useful in the process of the present invention.

Not all wetting agents are equally effective but simple tests will quickly show which are more useful for practical purposes.

In particular we have found that wetting agents consisting of aliphatic amines are very suitable, e.g. wetting agents known as "Armeen" and "Duomeen" viz:

Armeen 12 (95% dodecylamine).
Armeen T (tallow amine).
Duomeen C (derived from coconut oil fatty acids and containing two amine groups).

The Duomeen C was particularly effective but as this also has greater tendency to emulsification it should be used in smaller concentrations, e.g. 0.05 to 0.4 percent by weight of the oil. In a particular test the addition of 0.2 percent Duomeen C was found to increase the area of contact between kerosene and a painted steel plate by 14.5 times.

These "Armeen" wetting agents are essentially primary amines having a comparatively long carbon chain in the molecule. They may be represented by the formula $RNH_2$ where R represents a hydrocarbon chain containing at least 6 carbon atoms. The "Armeen" compounds contain from 6 to 18 carbon atoms in the R group but amines having longer carbon chains may be used. In addition to these primary amines the secondary and tertiary amines derived from these long chain primary amines may be used. In addition quaternary amine salts derived from the primary amines and soluble in the kerosene may be added.

The "Duomeens" are compounds containing both a primary amine group and a secondary amine group and which have the general formula $RNHC_3H_6NH_2$ where R is a long chain hydrocarbon radical preferably containing 6 to 18 carbon atoms.

The wetting agent may be selected such as to have a toxic effect on the marine growth. Simple tests can readily be employed to ascertain whether a particular wetting agent is toxic to any particular class of marine vegetation. Most suitably the wetting agent employed is toxic to all types of marine growth causing the fouling which is to be prevented or reduced.

The presence of the cationic wetting agents of the type described above in the liquid marine growth deterrent causes any particles thereof in the sea water to become positively charged and they are thus attracted towards the metallic structure which is cathodic, i.e. negatively charged. This ensures rapid and efficient utilisation of the liquid deterrent and the rapid build up of a thin layer of the deterrent on the surface to be protected.

The process of the present invention is particularly useful as applied to the reduction of marine fouling of ships having metallic hulls. The ship's hull is made a cathode by, for instance, supplying a number of insulated anodes beneath the ship and applying a potential difference between the anodes and the hull. The anodes are preferably so shaped and positioned that the maximum current density flows to those portions of the surfaces of the structure where it is desired to have maximum build up of the liquid deterrent.

If desired also we may incorporate a tri-alkyl or tri-aryl tin compound, as herein defined, in the liquid deterrent in accordance with the invention described in co-pending patent application No. 780,940. The proportion of the tin compound may be from 0.01 to 0.2 percent by weight of the liquid deterrent.

By tri-alkyl or tri-aryl tin compound is meant a compound having the formula $R_3SnX$ in which the R radicals represent lower alkyl groups (not more than 6 carbon atoms), aryl groups and aralkyl groups. The aromatic nuclei in the aryl or aralkyl groups can contain various nuclear substituents such as halide groups, nitro groups, alkyl groups and the like. The individual R radicals can be the same or different. X represents inorganic or organic acid residues, a hydroxide group or a group having the formula OY which is connected to the tin atom through the oxygen atom and in which Y is an R radical as defined above or the group —$SnR_3$.

The tin compounds used in the process of the present invention have a marked growth deterrent effect on marine fouling and consequently their use considerably reduces the growth of marine organisms on the structure.

The liquid, marine growth deterrent can be discharged against the structure being treated by any convenient means so that the deterrent makes contact with all those portions of the structure which it is desired to protect. When the liquid deterrent is less dense than sea water it can be discharged as such beneath the structure so that in rising to the surface of the sea it comes into contact with those underwater surfaces of the structure to be protected.

It is often convenient to employ a gas as a carrier for the liquid deterrent. In this technique the liquid deterrent is distributed in a suitable gas which is then forced into the sea beneath the structure to be protected. The point or points of discharge of the gas are so arranged that the gas rising to the surface of the sea passes over those surfaces of the structure which it is desired to protect and in so doing carries the liquid deterrent to those surfaces. Any gas can be employed as the carrier, but most suitably air or exhaust gases from an internal combustion engine are used.

The process of the present invention is of particular value in the protection of ships' hulls from marine fouling and in such cases the liquid, marine growth deterrent is most conveniently applied to the underwater surface of the hull by discharging the deterrent in a carrier gas beneath the hull. Means for passing gases, which may or may not contain liquid additives, over the underwater surfaces of ships' hulls are well known and any of these known means can be employed. Most suitably a ship is equipped with a system of perforated pipes beneath its hull which are so positioned that when a carrier gas containing the liquid marine growth deterrent and wetting agent is discharged through the perforations, the bubbles of gas containing the deterrent make good contact over substantially all of the underwater surface of the hull.

It is found that the settlement of marine fouling organisms on ships' hulls takes place primarily when the ship is stationary or near-stationary, as for instance when the ship is in harbour. A particular advantage of the process of the present invention is that by ensuring the efficient distribution of the liquid deterrent over the underwater surface of the hull, it is possible to reduce the amount of deterrent required to a minimum value and thus reduce the possibility of harbour pollution. A further advantage of the efficient distribution of the liquid deterrent on the underwater surface of the hull is that a thin layer of deterrent remains on the hull surface for a considerable period after the discharge of a deterrent has been stopped with a result that the ship's hull is protected against marine fouling for long periods without the need for the continuous discharge of fresh deterrent. This again reduces the possibility of harbour pollution.

We claim:

1. A composition for the reduction of the marine fouling of metal structures immersed in seawater consisting of a liquid paraffin hydrocarbon together with Wetting agent _____ 0.05 to 0.4 percent by weight of the hydrocarbon.
A compound selected from the group consisting of tri-alkyl and tri-aryl tin compounds _____ 0.01 to 0.2 percent by weight of the hydrocarbon.

said wetting agent being a compound selected from the group consisting of compounds having the formula $RNH_2$ where R is a hydrocarbon chain containing 6 to 18 carbon atoms, and compounds having the formula $$RNHC_3H_6NH_2$$

where R is also a hydrocarbon chain containing 6 to 18 carbon atoms; and said tin compound having the formula $R_3SnX$ where R is a radical selected from alkyl groups having not more than 6 carbon atoms, aryl groups, and aralkyl groups; and X is a radical selected from hydroxides, acid radicals and groups having the formula OY in which Y is a radical selected from alkyl groups having not more than 6 carbon atoms, aryl groups and aralkyl groups.

2. A composition as claimed in claim 1, wherein the wetting agent is a mixture of aliphatic amines derived from coconut oil fatty acids.

3. A process for the reduction of the marine fouling of structures immersed in sea water comprising discharging against the structure a composition as claimed in claim 1.

4. A process as claimed in claim 3, wherein the composition is discharged by means of a gaseous carrier.

References Cited in the file of this patent

UNITED STATES PATENTS

| | | |
|---|---|---|
| 1,888,023 | Adams | Nov. 15, 1932 |
| 2,521,720 | Hill | Sept. 12, 1950 |
| 2,758,086 | Stuart et al. | Aug. 7, 1956 |
| 2,784,104 | Baseman et al. | Mar. 5, 1957 |

FOREIGN PATENTS

| | | |
|---|---|---|
| 734,119 | Great Britain | July 27, 1955 |